J. WHITE.
HAWK-TRAPS.

No. 179,380. Patented June 27, 1876.

WITNESSES:
H. Rydquist
John Goethals

INVENTOR,
Joseph White
BY
Munn
ATTORNEYS.

UNITED STATES PATENT OFFICE.

JOSEPH WHITE, OF ANDERSON, TEXAS.

IMPROVEMENT IN HAWK-TRAPS.

Specification forming part of Letters Patent No. 179,380, dated June 27, 1876; application filed May 1, 1876.

*To all whom it may concern:*

Figure 1:
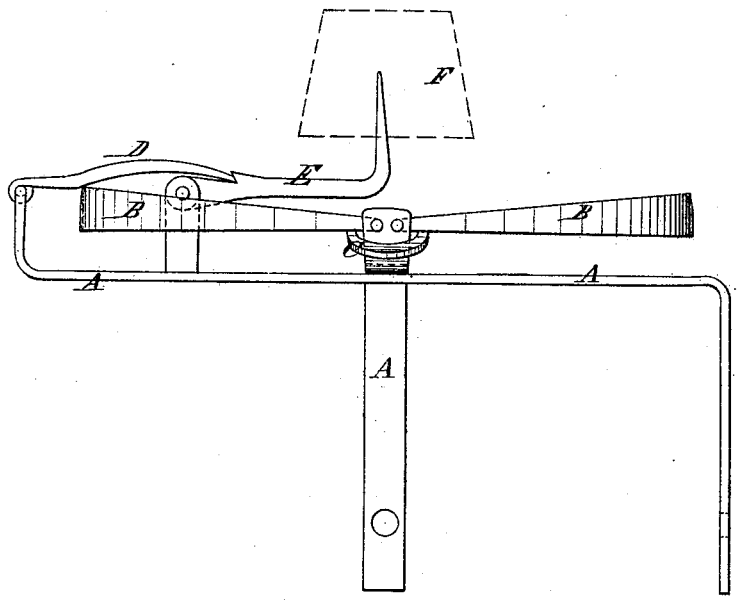
Figure 2:
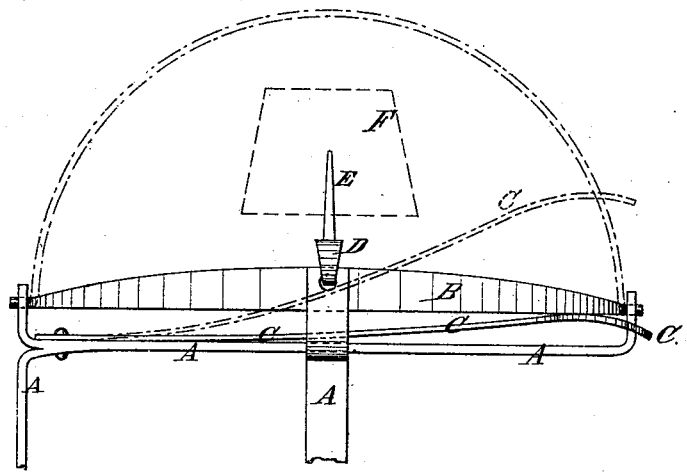

Be it known that I, JOSEPH WHITE, of Anderson, Grimes county, Texas, have invented a new and Improved Hawk-Trap, of which the following is a specification:

Figure 1 is a side view of my improved hawk-trap, and Fig. 2 is a view of the same turned one-quarter around.

Similar letters of reference indicate corresponding parts.

The object of this invention is to furnish an improved trap for catching hawks, owls, and other birds of prey, which shall be so constructed as to adapt it to be attached to a pole or post set in the ground.

The invention consists of an improved trap formed of the crossed bars, provided with the downwardly-projecting ends, the jaws, the spring, the catch-bar, the trigger, having its free end bent upward, and the perch-block, constructed and arranged in connection with each other, as hereinafter fully described.

A are the two bars crossing each other at right angles, and riveted to each other at the point of intersection. One end of each of the bars A is bent downward at right angles, and has a hole formed through it to receive the nails or screws, by which the trap is secured to the top of a post or pole set in the ground. B are the jaws, which are semicircular in form, and are pivoted to lugs formed upon or attached to one of the bars A. C is the spring, which is attached to one end of the bar A, to which the jaws B are pivoted near one end of said jaws, and has a hole formed in its other end, through which the other ends of the jaws B pass. To the end of the other bar A is pivoted the end of the catch-bar D, which crosses one of the jaws B, and catches in a notch in the trigger E when the trap is set. The trigger E is pivoted to the same bar as the catch-bar D, and its forward end is bent upward, and has a block, F, of cork or other light substance attached to it, which, when the trap is set, projects upward above the rest of the trap, and seems a convenient object for the bird to alight upon.

Having thus described my invention, I claim as new and desire to secure by Letters Patent—

An improved trap formed of the crossed bars A, provided with the downwardly-projecting ends, the jaws B, the spring C, the catch-bar D, the trigger E, having its free end bent upward, and the perch-block F, constructed and arranged in connection with each other, substantially as herein shown and described.

JOSEPH WHITE.

Witnesses:
W.M. H. TAYLOR,
W. F. OSBORNE.